(12) United States Patent
Han De Man et al.

(10) Patent No.: US 10,113,541 B2
(45) Date of Patent: Oct. 30, 2018

(54) VALVES AND PUMPS USING SAID VALVES

(71) Applicant: MeadWestvaco Calmar Netherlands BV, Richmond, VA (US)

(72) Inventors: Eelco Han De Man, Vlijmen (NL); Stefan Koster, Rotterdam (NL)

(73) Assignee: SILGAN DISPENSING SYSTEMS NETHERLANDS B.V., Waalwijk (NL)

( * ) Notice: Subject to any disclaimer, the term of this patent is extended or adjusted under 35 U.S.C. 154(b) by 1241 days.

(21) Appl. No.: 13/689,136

(22) Filed: Nov. 29, 2012

(65) Prior Publication Data

US 2014/0144534 A1    May 29, 2014

(51) Int. Cl.
| | | |
|---|---|---|
| *F04B 53/10* | (2006.01) | |
| *B05B 11/04* | (2006.01) | |
| *F16K 15/14* | (2006.01) | |
| *F04B 39/10* | (2006.01) | |
| *B05B 11/00* | (2006.01) | |
| *F16K 1/38* | (2006.01) | |

(52) U.S. Cl.
CPC .......... *F04B 39/10* (2013.01); *B05B 11/3036* (2013.01); *B05B 11/3064* (2013.01); *F04B 53/10* (2013.01); *F16K 15/148* (2013.01); *F16K 1/385* (2013.01); *Y10T 137/7887* (2015.04)

(58) Field of Classification Search
CPC ............. B05B 11/3035; B05B 11/3036; B05B 11/3033; B05B 11/3032; B05B 11/3064; B05B 11/3018; B05B 11/0043; B05B 11/0067; B05B 11/007; F04B 45/02; F04B 39/10; F04B 53/10; F16K 15/148; F16K 1/385; Y10T 137/789; Y10T 137/7843; Y10T 137/7887

USPC ........ 417/479, 374; 222/107, 207, 209, 212, 222/213, 214, 215, 380, 495, 383.1; 137/854, 512.4

See application file for complete search history.

(56) References Cited

U.S. PATENT DOCUMENTS

| | | | |
|---|---|---|---|
| 1,968,779 | A * | 7/1934 | Johnsen ..................... 251/87 |
| 2,888,034 | A * | 5/1959 | Glegg ................. F04B 53/1092 |
| | | | 137/512.4 |
| 2,943,417 | A | 7/1960 | Greenspan |
| 3,130,877 | A | 4/1964 | Miller |
| 3,715,060 | A | 2/1973 | Benson |
| 3,752,366 | A | 8/1973 | Lawrence, Jr. |
| 3,987,938 | A | 10/1976 | Cooprider et al. |
| 4,168,020 | A | 9/1979 | Benson |
| 4,197,265 | A | 4/1980 | Burke |

(Continued)

FOREIGN PATENT DOCUMENTS

| | | |
|---|---|---|
| CH | 680358A5 A5 | 8/1992 |
| DE | 29823309 U1 | 8/1999 |

(Continued)

OTHER PUBLICATIONS

International Search Report for PCT/US2010/029140 published as WO2010117754A3 dated Oct. 14, 2010.

(Continued)

*Primary Examiner* — Nathan Zollinger
(74) *Attorney, Agent, or Firm* — Barlow, Josephs & Holmes, Ltd.

(57) ABSTRACT

Improved, rigid valves for pumps include ribs or other support structures, increased diameters and cross-sectional areas, and conically shaped outlet valves.

13 Claims, 7 Drawing Sheets

(56) References Cited

U.S. PATENT DOCUMENTS

| | | | |
|---|---|---|---|
| 4,330,071 A | | 5/1982 | Ohlson |
| 4,394,936 A | | 7/1983 | Shavit |
| 4,765,364 A | * | 8/1988 | Arcari .................. F16K 15/063 |
| | | | 137/515.5 |
| 4,830,284 A | | 5/1989 | Maerte |
| 5,518,147 A | | 5/1996 | Peterson et al. |
| 5,524,793 A | * | 6/1996 | O'Neill ................. B05B 11/306 |
| | | | 222/153.13 |
| 5,524,795 A | * | 6/1996 | Lee .................... B65D 47/2068 |
| | | | 222/207 |
| 5,730,327 A | * | 3/1998 | Stern .................... A47K 5/1209 |
| | | | 222/105 |
| 5,860,567 A | | 1/1999 | Fuchs et al. |
| 6,012,613 A | * | 1/2000 | Chen ........................... 222/207 |
| 6,158,620 A | | 12/2000 | Polan |
| 6,241,122 B1 | | 6/2001 | Araki et al. |
| 6,419,117 B1 | | 7/2002 | Bosch |
| 6,971,553 B2 | | 12/2005 | Brennan et al. |
| 7,322,491 B2 | | 1/2008 | Py et al. |
| 7,891,583 B2 | | 2/2011 | Sayers et al. |
| 7,931,173 B2 | | 4/2011 | Yuan |
| 7,959,037 B2 | * | 6/2011 | Ophardt et al. ........... 222/321.9 |
| 2002/0074359 A1 | | 6/2002 | Weber |
| 2008/0029547 A1 | * | 2/2008 | Yuan ............................ 222/207 |
| 2008/0116226 A1 | | 5/2008 | Py et al. |
| 2008/0156829 A1 | | 7/2008 | Chen |
| 2009/0183371 A1 | | 7/2009 | Mileti et al. |
| 2009/0285510 A1 | | 11/2009 | Huang |
| 2010/0320226 A1 | * | 12/2010 | Nilsson ................ A47K 5/1209 |
| | | | 222/207 |
| 2011/0031278 A1 | | 2/2011 | Han de Man |
| 2012/0014824 A1 | | 1/2012 | Han De Man |
| 2012/0097709 A1 | | 4/2012 | Han De Man |

FOREIGN PATENT DOCUMENTS

| | | | | |
|---|---|---|---|---|
| DE | 10330040 | | 1/2005 | |
| DE | 102005012506 A1 | | 1/2007 | |
| EP | 1561515 | | 8/2005 | |
| EP | 1886736 A1 | | 2/2008 | |
| EP | 2052786 | | 4/2009 | |
| EP | 2251655 A1 | | 11/2010 | |
| FR | 2127774 A5 | | 10/1972 | |
| FR | 2976981 | | 12/2012 | |
| GB | 2150226 A | | 6/1985 | |
| GB | 2329222 A | * | 3/1999 | ........... A47K 5/1209 |
| JP | 63161152 U | | 10/1988 | |
| WO | WO9953388 A1 | | 10/1999 | |
| WO | WO03/084673 | | 10/2003 | |
| WO | WO2010089501 A1 | | 8/2010 | |
| WO | WO2010/105642 | | 9/2010 | |
| WO | WO2010/117754 | | 10/2010 | |
| WO | WO2010/117754 A2 | | 10/2010 | |
| WO | WO2011099309 A1 | | 8/2011 | |
| WO | WO 2013/135883 | | 9/2013 | |

OTHER PUBLICATIONS

International Search Report and Preliminary Report for PCT/US2011/057781 published on May 3, 2012.
European Search Report on EP11182255, published on Jan. 22, 2013.
International Search Report for PCT/US2012/065527 published on Feb. 14, 2013.
International Search Report from PCT/EP2013/074763 dated Mar. 13, 2014.
International Search Report from PCT/EP2013/074778 dated Mar. 31, 2014.

* cited by examiner

FIG. 12

VALVES AND PUMPS USING SAID VALVES

BACKGROUND OF THE INVENTION

Field of the Invention:

Embodiments of the invention relate to valves for pump devices and more particularly to improved valves having both inlet and outlet components.

State of the Art:

The personal and beauty care markets utilize a wide variety of different pump mechanisms and devices for delivering fluid-based product to a user. Such pump devices include traditional pumps using ball valves or flap valves. Unique pump devices may also increase the aesthetic value or appeal of the pump device or to provide unique functionality to a pump device. For example, as illustrated and described in WO2010/117754, which is incorporated herein in its entirety by reference, a pump may include a base having an inlet passage, an interior chamber, and a discharge passage. A valve having a valve stem, an outlet valve at one end of the valve stem and an inlet valve or valve disc at an opposite end of the valve stem, may be seated in the base such that the outlet valve may open and close a passage through the discharge passage and the inlet valve or valve disc may open and close a passage from a container into the interior chamber of the base.

Figure 1:
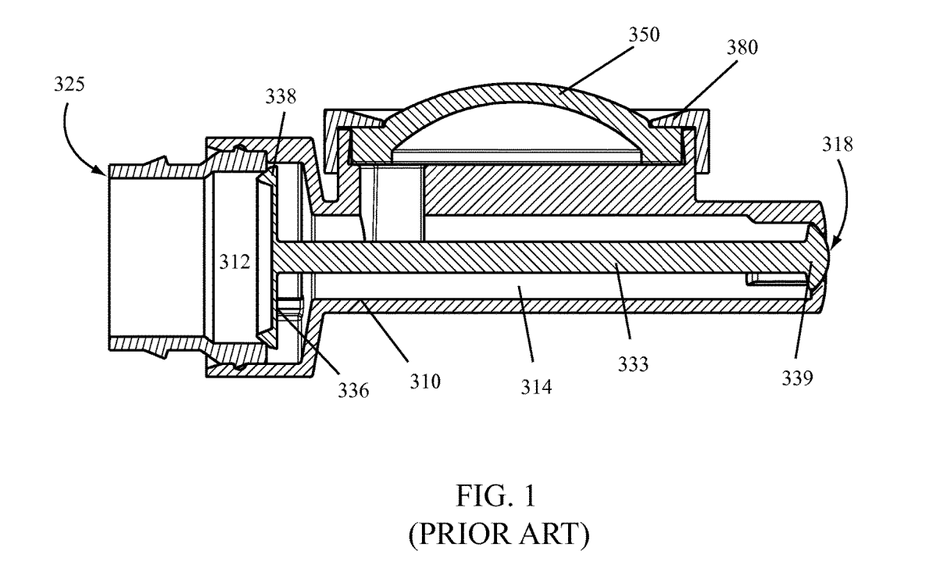
FIG. 1 illustrates a pump and valve according to the prior art.
Figure 2A:
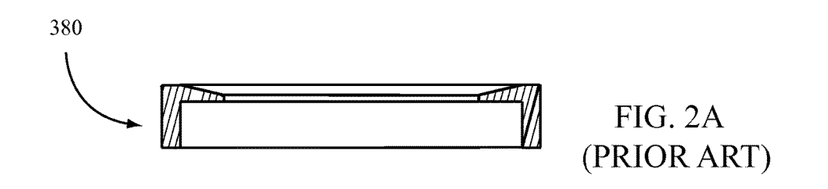
FIGS. 2A through 2D illustrate components of a pump according to various prior art embodiments.
Figure 2B:
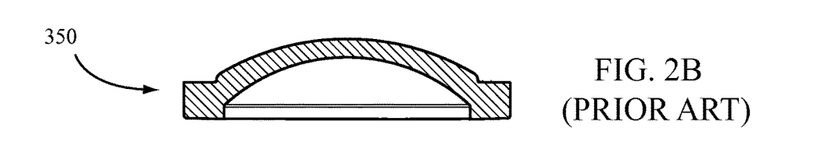
Figure 2C:
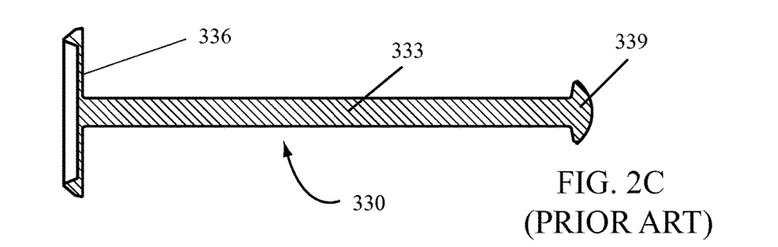
Figure 2D:
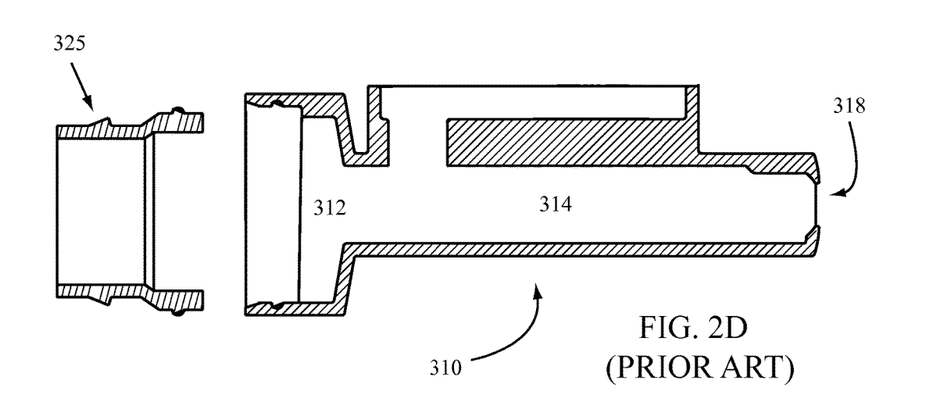

A pump 300 as described in WO2010/117754 is illustrated in FIG. 1 and the components thereof are illustrated in FIGS. 2A through 2D. In particular, a pump 300 may include a base 310 having an inlet passage 312, an interior chamber 314, and a discharge passage 318. A valve 330 may be positioned in the base and may include a valve stem 333, an outlet valve 339 at one end of the valve stem 333 and engaged with the discharge passage 318 in a closed position, and a valve disc 336 at a valve stem 333 end opposite the outlet valve 339, engaged with or acting as an inlet valve in the inlet passage 312. A bellow 350 may be secured to the base 310 with a cap 380. The base 310 may be secured to an attachment adapter 325 or container.

While the pumps and assemblies illustrated and described in WO2010/117754 may provide sufficient operation, one draw-back is the rigidity or stiffness of the valve used therewith, which can impact performance and assembly of a pump. Thus, improvements to such pumps and the valves used with such pumps are desirable.

BRIEF SUMMARY OF THE INVENTION

According to certain embodiments of the invention, a valve for a pump assembly may include an improved valve stem. According to certain embodiments of the invention, a valve stem may be improved by providing a thicker cross-sectional area than used with prior valve devices. According to other embodiments of the invention, a valve stem may be improved by providing a geometric shaped cross-sectional area such that the geometric shape may provide increased stiffness to the valve and the valve stem.

According to still other embodiments of the invention, an improved valve may include an outlet valve portion having a conical shape. In some embodiments of the invention, a conically shaped outlet valve may be configured to seat in a conically shaped discharge passage of a pump base.

According to other embodiments of the invention, an improved valve may include both an improved valve stem configuration and an improved outlet valve. For example, an improved valve according to various embodiments of the invention may include a conical outlet valve and a valve stem having a width substantially similar to the largest diameter of the conical outlet valve. In other embodiments, an improved valve may include a conical outlet valve and a valve stem having a cross-shaped cross-sectional area. In still other embodiments, an improved valve may include a conical outlet valve and a valve stem having one or more support ribs running at least a partial length of the valve stem.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

According to embodiments of the invention, a valve 130 for a pump may include a valve stem 133, an outlet valve 139 and a valve disc 136. The outlet valve 139 and valve disc 136 may be on opposite end of the valve stem 133.

A valve 130 according to various embodiments of the invention is illustrated in FIGS. 3 through 6. As illustrated, a valve 130 may include a valve stem 133 having an outlet valve 139 adjacent one end thereof and a valve disc 136, or inlet valve, located on an end of the valve stem 133 opposite the outlet valve 139. The outlet valve 139 may be rounded or have a circular or oval shape. According to various embodiments of the invention, a diameter of the outlet valve 139 may be configured or selected such that the outlet valve may seat against a discharge passage 318 of a pump to prevent discharge of a product from the pump until the valve stem 133 is moved, resulting in an unseating of the outlet valve 139 from a discharge passage 318.

According to some embodiments of the invention, a valve stem 133 may extend from the outlet valve 139 to a valve disc 136 at an opposite end thereof. A valve stem 133 may include a cross-sectional portion having a width as large as a diameter of the outlet valve 139 over at least a portion of the valve stem 133. At a portion of the valve stem 133 nearing the valve disc 136, the valve stem 133 may narrow or converge towards a central portion of the valve disc 136. For example, the valve 130 illustrated in FIGS. 3 through 6 includes a valve stem 133 having a cross-sectional width equal to the largest diameter of the outlet valve 139 over a portion of the valve stem 133. At a point near the valve disc 136, the valve stem 133 narrows or converges towards a central portion of the valve disc 136, creating a narrowed region in the valve stem 133 adjacent the valve disc 136.

Figure 4:
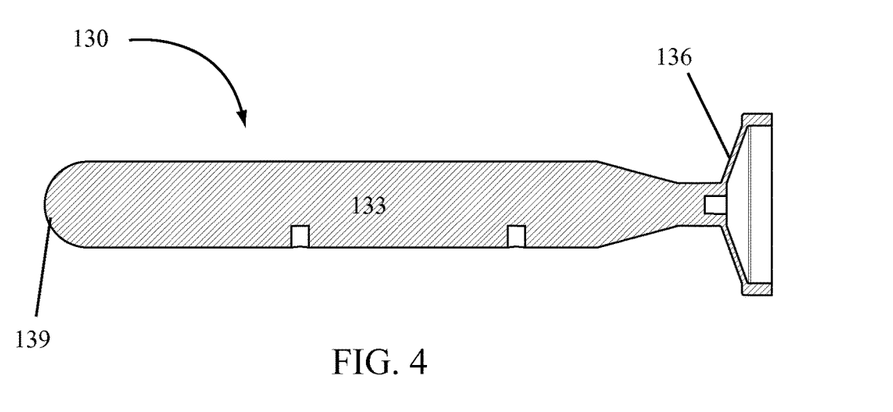
FIG. 4 illustrates a cross-sectional view of a valve along its length according to various embodiments of the invention.

As shown in the cross-sectional view of FIG. 4, the cross-sectional area of the valve stem 133 remains as thick as the cross-sectional diameter of the outlet valve 139 across a large portion of the valve stem 133. Only nearer the valve disc 136 does the cross-sectional area of the valve stem 133 begin to decrease or narrow.

Figure 3:
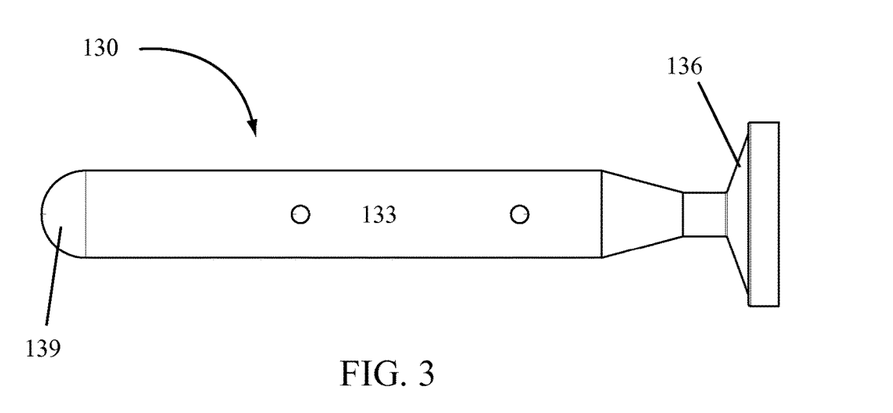
FIG. 3 illustrates a valve according to various embodiments of the invention.
Figure 5:
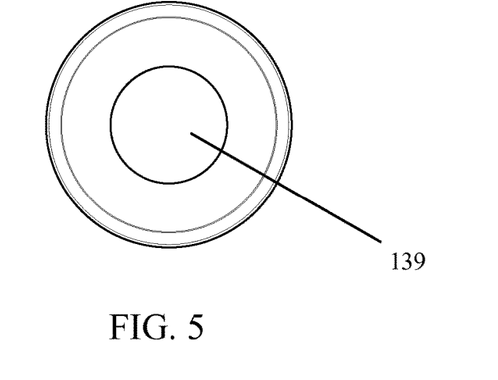
FIG. 5 illustrates a front view of a valve according to various embodiments of the invention.
Figure 6:
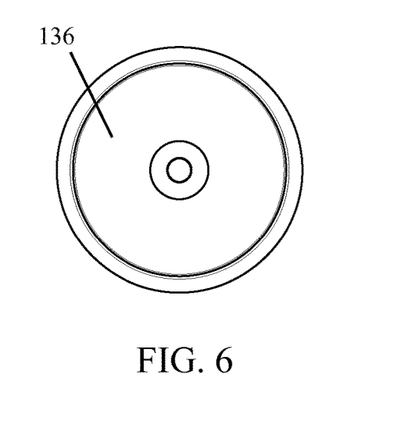
FIG. 6 illustrates a rear view of a valve according to various embodiments of the invention.

FIG. 5 illustrates a front view of the valve 130 illustrated in FIGS. 3 and 4 and FIG. 6 illustrates a rear view thereof. As illustrated, the diameter of the valve stem 133 at a forward portion of the valve stem 133 nearest the outlet valve 139 is greater than at the point where the valve stem 133 joins with the valve disc 136.

According to various embodiments of the invention, a valve 130 having a thicker valve stem 133—or a valve stem 133 with an initial width or shape equivalent to a cross-sectional area of the outlet valve 139—with a narrowing of the valve stem 133 adjacent to the valve disc 136 provides a stiffer or more rigid valve 130 than those of the prior art.

According to some embodiments of the invention, a valve stem 133 may be configured or shaped such that the cross-sectional area or width of the majority of the length of the valve stem 133 relative to the cross-sectional area or width of the valve stem 133 at the point of convergence with the valve disc 136 provides a desired force to resist movement of the valve stem 133 relative to the valve disc 136. In this manner, the force required to open an outlet valve 139 may be adjusted by changing the configuration of the valve stem 133 thickness along the valve stem 133 and at the point of convergence with the valve disc 136.

Figure 7:
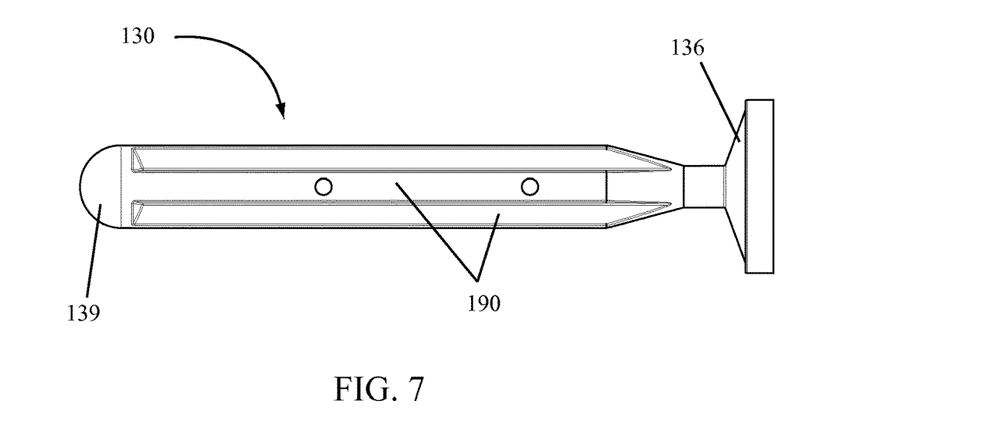
FIG. 7 illustrates a valve according to various embodiments of the invention.
Figure 8:
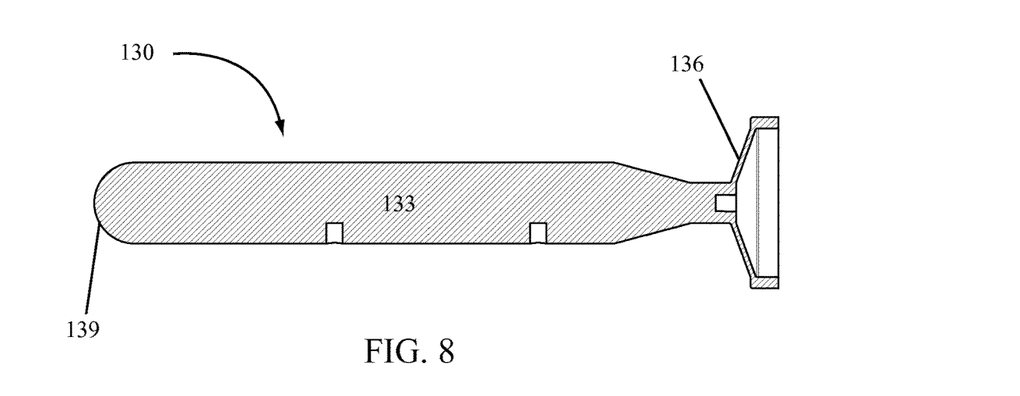
FIG. 8 illustrates a cross-sectional view of a valve along its length according to various embodiments of the invention.
Figure 9:
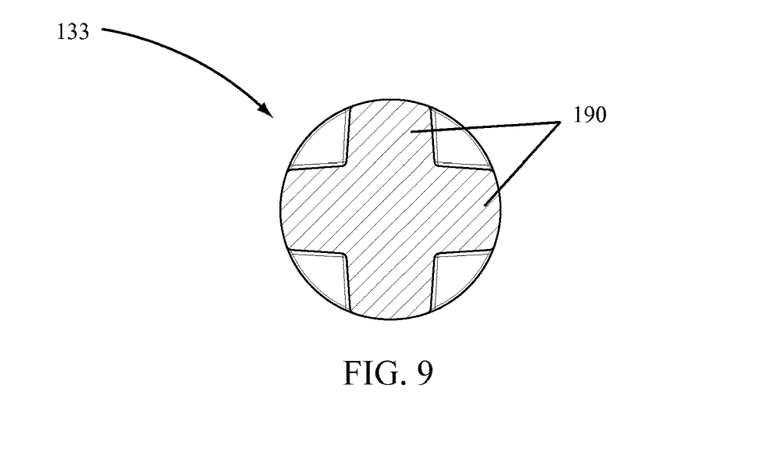
FIG. 9 illustrates a cross-sectional view of a valve along its width according to various embodiments of the invention.

A valve 130 according to other embodiments of the invention is illustrated in FIGS. 7 through 9. As illustrated, a valve 130 may have one or more ribs 190 or other stiffing features running along a length—or part of a length—of the valve stem 133. In other embodiments, ribs 190 or stiffening features may run along portions of the width or circumference of a valve stem 133.

According to various embodiments of the invention, a valve stem 133 may include four ribs 190 running along a portion of a length thereof as illustrated in FIG. 7. The ribs 190 may extend from the outlet valve 139 end of the valve 130 towards the valve disc 136. Adjacent to the valve disc 136, the ribs 190 may narrow or converge towards the valve disc 136 as illustrated.

A cross-sectional view of the valve stem 133 and ribs 190 is illustrated in FIG. 9. As illustrated, the valve stem 133 and ribs 190 may form a cross shape or "X" shape. In other embodiments of the invention, two or three ribs 190 could be used instead of four. In addition, more than four ribs 190 could be used with various embodiments of the invention.

In still other embodiments of the invention, portions of the exterior surface of the ribs 190 may be configured such that they contact the walls of a base 310 when assembled with a base 310 of a pump. Such contact may provide further stability or may be used for assembly purposes to guide a valve 130 into a desired assembled position. In still other embodiments of the invention, one or more support ribs may be configured as part of a valve stem 133, or on a valve stem 133, in such a manner that when assembled with a base 310 of a pump, at least some of the one or more support ribs 190 contact a portion of an interior chamber of the base. During actuation of the pump and movement of the valve 130, contact between those portions of the valve stem 133 and the walls of the interior chamber of the base 310 may prevent flexion or movement in a direction other than parallel to the axis through the pump base 310 from the inlet orifice to the discharge passage 318.

According to some embodiments of the invention, a valve 130 having ribs 190 may provide a more rigid valve 130 than those of the prior art.

According to various embodiments of the invention, a valve stem 133 of a valve 130 may be shaped or configured to provide increased rigidity to the valve 130. For instance, a valve stem 133 may be a solid valve stem 133 having a narrowing portion adjacent a valve disc 136. In other embodiments, a valve stem 133 may include shaped features or ribs 190 running along a length or width of the valve stem 133 to provide support, rigidity, and stiffness to the valve stem 133 and the valve 130. In still other embodiments of the invention, the rigidity or stiffness of a valve 130 may be increased by utilizing a valve stem 133 shape which narrows as the valve stem 133 approaches a valve disc 136. Ribs 190 or other features may be added to the valve stem 133 to increase the rigidity or stiffness of the valve 130.

Figure 10:
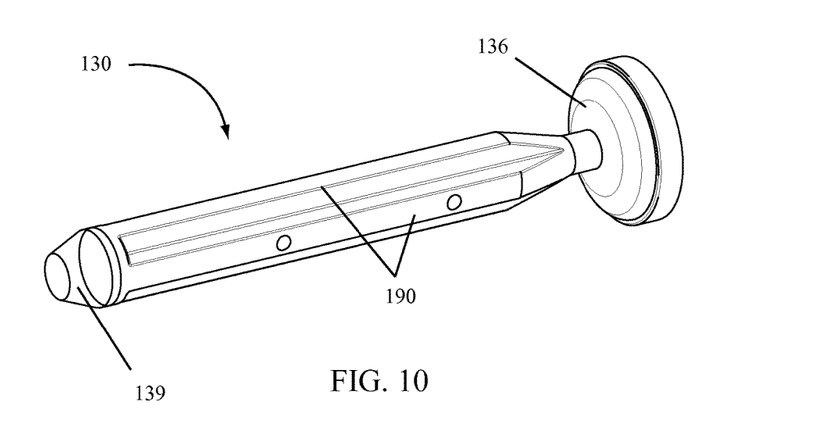
FIG. 10 illustrates a perspective view of a valve according to various embodiments of the invention.
Figure 11:
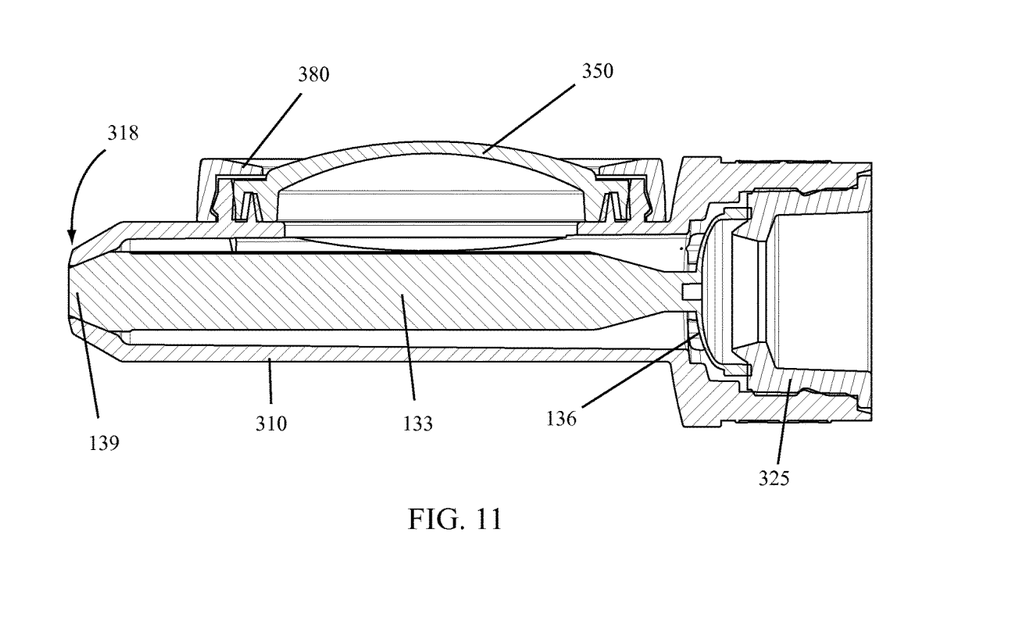
FIG. 11 illustrates a cross-sectional view of a pump including a valve according to various embodiments of the invention.

A valve 130 according to still other embodiments of the invention is illustrated in FIGS. 10 and 11. As illustrated in FIG. 10, a valve 130 may include a conical outlet valve 139. Although rounded outlet valves may be used with various embodiments of the invention, it has been found that the use of a conical outlet valve 139 with a pump base 310 having a corresponding conical shaped discharge passage 318 provides a better seal or valve seat. Thus, in certain embodiments of the invention, a valve 130 may have a conically shaped outlet valve 139.

A pump assembled with a valve according to various embodiments of the invention is illustrated in FIG. 11. As illustrated, the pump may include a base 310 having a discharge passage 318. A valve 130 may be seated in the base 310 such that the outlet valve 139 seats against the discharge passage 318. An attachment adapter 325 may fit in an opposite end of the base 310 and secure the valve 130 within the base 310. In addition, the attachment adapter 325 may provide an inlet valve seat which mates with or contacts at least a portion of the valve disc 136 to provide an inlet valve for the pump from a container or pouch attached to the base 310 of the pump. A bellow 350 may be secured to the base 310 with a cap 380. Actuation of the bellow 350 with product in the base 310 may apply a force against the valve disc 136, which in turn may apply a force to the valve stem 133 and unseat the outlet valve 139 from the discharge passage 318, allowing product to flow from the pump as known.

As illustrated in FIG. 11, a valve 130 having a conically shaped outlet valve 139 is seated in a conically shaped discharge passage 318 of a pump base 310. The seat of the conical shaped outlet valve 139 may be matched to the discharge passage 318 to provide a superior seal. In addition, it has been found that the use of a conical shaped outlet valve 139 as illustrated may provide an improved discharge of product. This is especially true where the valve 130 is a stiffened valve according to embodiments of the invention. For example, when using a valve 130 according to embodiments of the invention having a conical shaped outlet valve 139, discharge of a product from the pump is more controlled. The conical shape of the outlet valve 139 and corresponding shape of the discharge passage 318 provides an improved valve seat which stabilizes the flow of product out the discharge valve and provides a cleaner shut-off when the outlet valve 139 re-seats with the discharge passageway 318.

Figure 12:
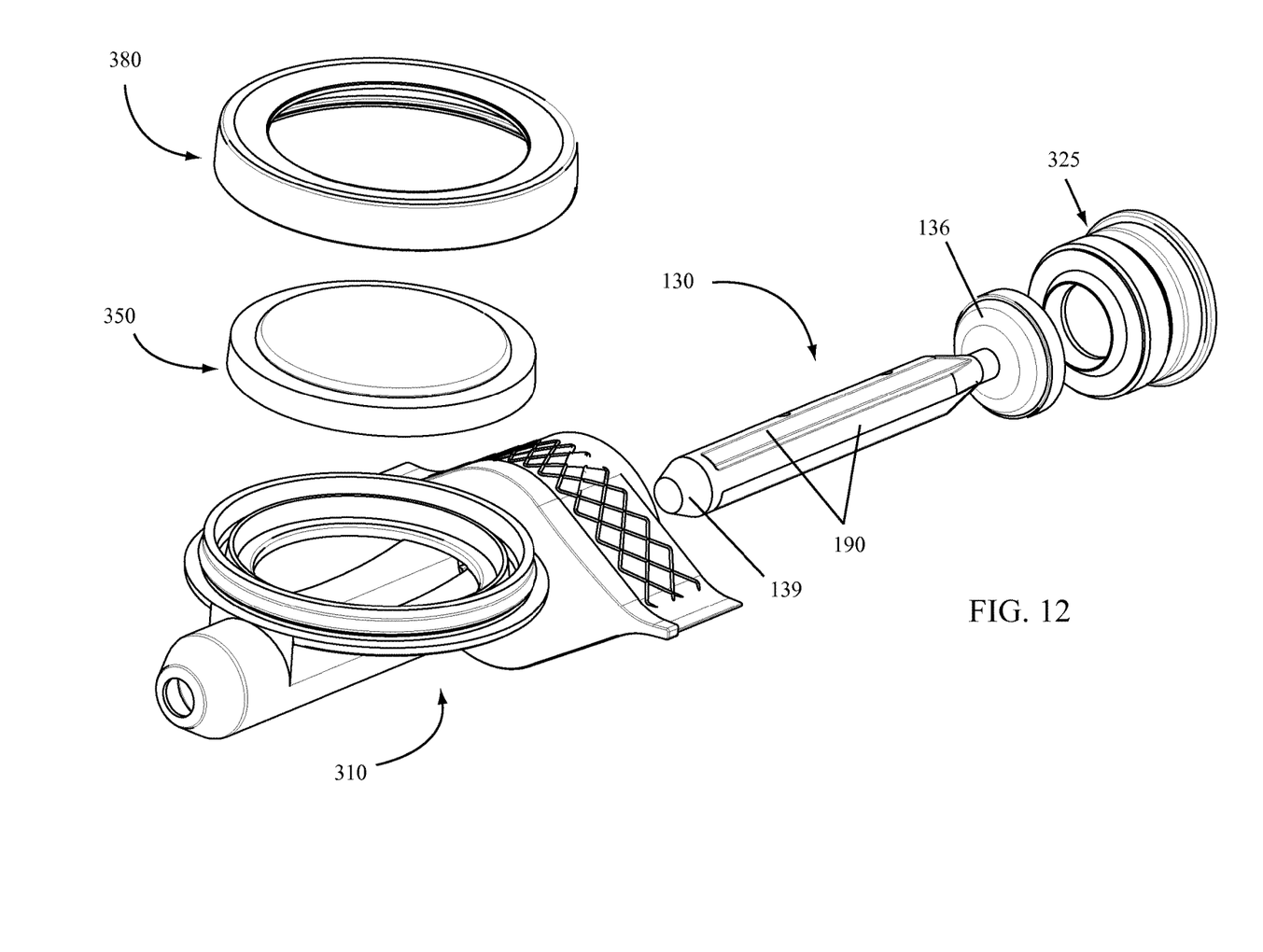
FIG. 12 illustrates a perspective, component view of a pump including a valve according to various embodiments of the invention.

A pump assembly according to various embodiments of the invention is illustrated in FIG. 12. As illustrated, a pump may include a base 310, a valve 130 fitted in the base 310, an attachment adapter 325 fitted into the base 310 to secure the valve 130 therein, and a bellow 350 secured with a cap 380. In some embodiments of the invention, a base 310 may include a canoe shaped attachment for securing the pump to a pouch or other container. A valve 130 incorporated with—or assembled in—the pump may include a stiffened or rigid valve 130 according to embodiments of the invention. In addition, a valve 130 may include a conically shaped outlet valve 139 portion as illustrated.

Figure 13:
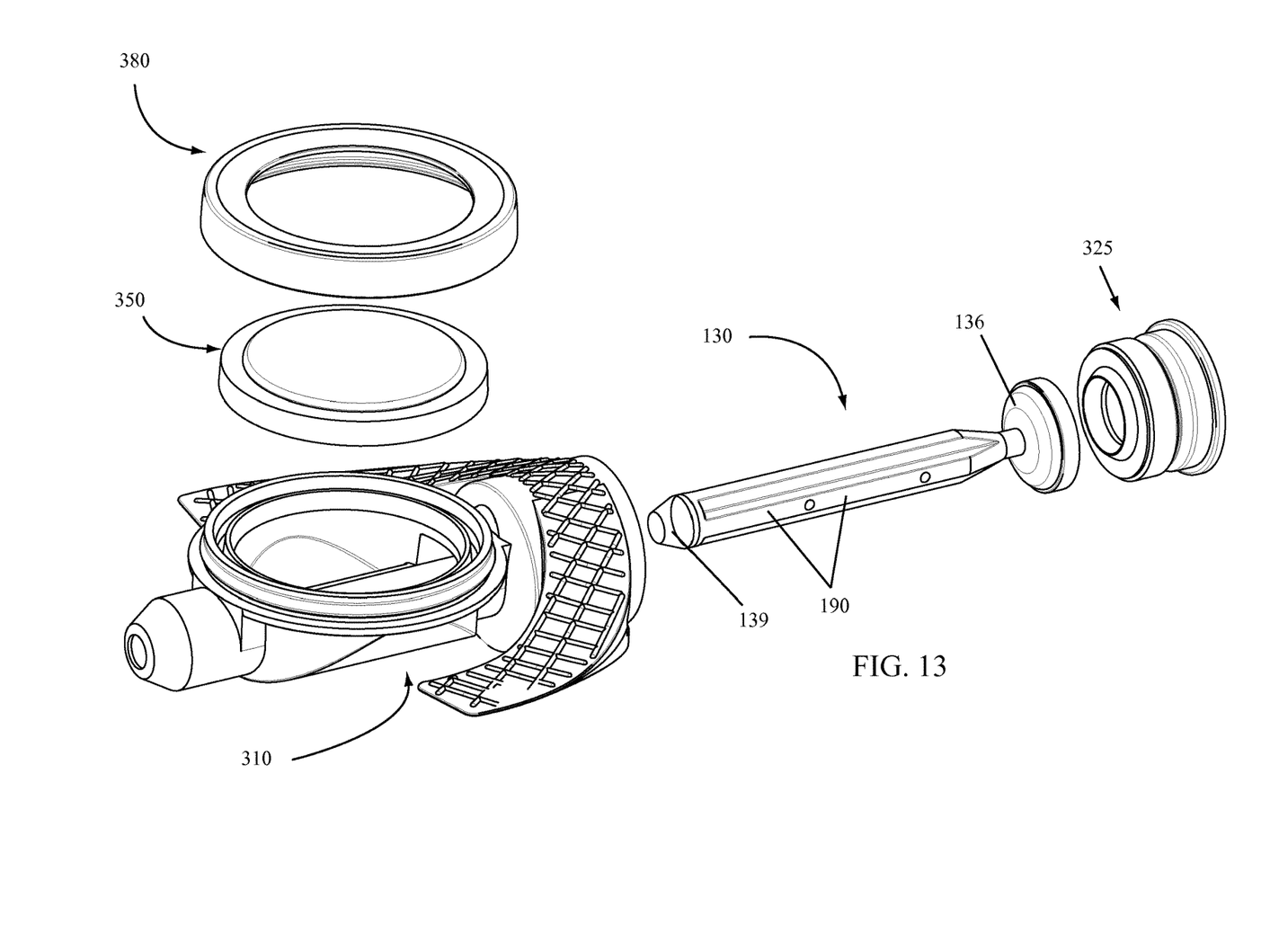
FIG. 13 illustrates a perspective, component view of a pump including a valve according to various embodiments of the invention.

A pump assembly according to various embodiments of the invention is illustrated in FIG. 13. As illustrated, a pump may include a base 310, a valve 130 fitted in the base 310, an attachment adapter 325 fitted into the base 310 to secure the valve 130 therein, and a bellow 350 secured with a cap 380. In some embodiments of the invention, a base 310 may include a canoe attachment having a curved shape for securing the pump to a pouch or other container. A valve 130 incorporated with—or assembled in—the pump may include a stiffened or rigid valve 130 according to embodiments of the invention. In addition, a valve 130 may include a conically shaped outlet valve 139 portion as illustrated.

Valves 130 according to various embodiments of the invention may be made of a flexible material such as TPE, TPU, silicon or other material. In addition, valves 130 according to other embodiments of the invention may be made of a plastic or resin material as known.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A valve for a pump, comprising:
a valve stem;
an outlet valve at a first end of the valve stem;
a valve disc at a second end of the valve stem, the valve disc having a substantially flexible semispherical shape configured to collapse; and
at least one longitudinal rib running a portion of the length of the valve stem between the outlet valve and the valve disc,
wherein proximate the second end, the at least one longitudinal rib tapers inward towards the valve stem as the rib extends in a direction from the first end towards the second end.

2. The valve of claim 1, wherein the at least one longitudinal rib comprises four longitudinal ribs.

3. The valve of claim 1, wherein the outlet valve comprises a rounded outlet valve.

4. The valve of claim 1, wherein the outlet valve comprises a conically shaped outlet valve.

5. A valve for a pump, comprising:
a valve stem;
an outlet valve at a first end of the valve stem; and
a valve disc at a second end of the valve stem, the valve disc having a substantially flexible semispherical shape configured to collapse;
wherein the valve stem has a diameter equal to the largest diameter of the outlet valve extending from the outlet valve towards the valve disc and a narrowing portion adjacent the valve disc, and
wherein the narrowing portion converges in diameter as the valve stem approaches the valve disc.

6. The valve of claim 5, wherein the outlet valve comprises a rounded outlet valve.

7. The valve of claim 5, wherein the outlet valve comprises a conically shaped outlet valve.

8. A pump, comprising:
a base;
a bellow seated in the base;
a cap securing the bellow in the base;
a valve in an interior portion of the base; and
an attachment adapter securing the valve in the base; and
wherein the valve comprises:
a valve stem;
an outlet valve at a first end of the valve stem seated against a discharge passage in the base; and
a valve disc at a second end of the valve stem and seated against the attachment adapter, the valve disc having a substantially flexible semispherical shape configured to collapse to unseat the outlet valve;
wherein the valve stem has a diameter equal to the largest diameter of the outlet valve extending from the outlet valve towards the valve disc and a narrowing portion adjacent the valve disc tapering inward from the largest diameter towards the valve disc.

9. The pump of claim 8, wherein the outlet valve comprises a rounded outlet valve.

10. The pump of claim 8, wherein the outlet valve comprises a conically shaped outlet valve.

11. The pump of claim 8, further comprising at least one longitudinal rib along a portion of the valve stem.

12. The pump of claim 8, wherein
the base includes,
a base rim;
a base bellows ring; and
a base cap ring extending away from the base rim and encircling the base bellows ring; and
the bellows includes,
an inner rim ring;
an outer rim ring encircling the inner rim ring;
wherein the outer rim ring is positioned interior of the base bellows ring and the base cap ring and the inner rim ring is positioned interior of the base bellows ring without contacting the base.

13. The pump of claim 8, wherein,
the base includes at least one base cap ring extending from the base, and
the cap is fitted to an exterior of the at least one base cap ring and configured to secure the bellows to the base.

* * * * *